United States Patent
Moriguchi et al.

(10) Patent No.: US 8,272,466 B2
(45) Date of Patent: Sep. 25, 2012

(54) ROBOT

(75) Inventors: Toshiki Moriguchi, Kyoto (JP);
Tsuyoshi Nakano, Kyoto (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 422 days.

(21) Appl. No.: 12/300,954

(22) PCT Filed: Jan. 17, 2007

(86) PCT No.: PCT/JP2007/050576
§ 371 (c)(1),
(2), (4) Date: Nov. 14, 2008

(87) PCT Pub. No.: WO2007/132571
PCT Pub. Date: Nov. 22, 2007

(65) Prior Publication Data
US 2009/0173561 A1  Jul. 9, 2009

(30) Foreign Application Priority Data

May 16, 2006  (JP) ................................. 2006-136594

(51) Int. Cl.
*B60T 7/16* (2006.01)
(52) U.S. Cl. ......... 180/167; 180/168; 700/258; 700/245
(58) Field of Classification Search .................. 180/168, 180/8.1, 7.1, 212, 20, 65.1, 167; 422/65, 422/63, 64; 700/245, 225, 250, 258, 259
See application file for complete search history.

(56) References Cited

U.S. PATENT DOCUMENTS

| | | | | |
|---|---|---|---|---|
| 5,213,176 A | * | 5/1993 | Oroku et al. | ............... 180/168 |
| 6,408,226 B1 | * | 6/2002 | Byrne et al. | ............... 700/225 |
| 6,443,543 B1 | * | 9/2002 | Chiang | ............... 180/65.1 |
| 6,687,571 B1 | * | 2/2004 | Byrne et al. | ............... 700/245 |
| 6,859,359 B2 | * | 2/2005 | Young et al. | ............... 361/679.34 |
| 6,865,447 B2 | * | 3/2005 | Lau et al. | ............... 700/245 |
| 6,941,199 B1 | | 9/2005 | Bottomley et al. | |

(Continued)

FOREIGN PATENT DOCUMENTS

EP   0 518 381 A1   12/1992

(Continued)

OTHER PUBLICATIONS

U.S. Appl. No. 12/299,916, filed Nov. 7, 2008, Moriguchi.

(Continued)

*Primary Examiner* — Hau Phan
(74) *Attorney, Agent, or Firm* — Oblon, Spivak, McClelland, Maier & Neustadt, L.L.P.

(57) ABSTRACT

A robot capable of traveling while constantly directing a predetermined part of a main body to a detection target. In the robot, a main body is jointed to a traveling unit so that relative rotation is possible between the main body and the traveling unit. Based on position information of a detection target detected by a position detection sensor, a control device controls, while the traveling unit is traveling, a body drive motor so that a front surface of the main body constantly faces the detection target and rotates the main body relative to the traveling unit. Accordingly, a CCD camera, a microphone, a speaker, display or the like provided on the front surface of the main body constantly face the detection target. Thus, the robot can reliably communicate with the detection target even during traveling, through mutual transmission of information between the robot and the detection target.

18 Claims, 7 Drawing Sheets

U.S. PATENT DOCUMENTS

| | | | |
|---|---|---|---|
| 6,945,341 B2 * | 9/2005 | Ogawa et al. | 180/8.1 |
| 6,961,640 B2 * | 11/2005 | Kuroki et al. | 180/8.1 |
| 7,016,505 B1 | 3/2006 | Nakadai et al. | |
| 7,155,308 B2 * | 12/2006 | Jones | 700/245 |
| 7,396,509 B2 * | 7/2008 | Burns | 422/65 |
| 7,742,845 B2 * | 6/2010 | Fink et al. | 701/2 |
| 7,856,290 B2 * | 12/2010 | Kumhyr | 180/65.1 |
| 7,894,941 B2 * | 2/2011 | Ogawa et al. | 700/258 |
| 2003/0130851 A1 * | 7/2003 | Nakakita et al. | 704/275 |
| 2005/0218292 A1 | 10/2005 | Kawabe et al. | |
| 2011/0172822 A1 * | 7/2011 | Ziegler et al. | 700/259 |

FOREIGN PATENT DOCUMENTS

| | | |
|---|---|---|
| EP | 0 937 612 A2 | 8/1999 |
| JP | 61 19806 | 2/1986 |
| JP | 5-189041 | 7/1993 |
| JP | 2001 260056 | 9/2001 |
| JP | 2001-260056 | 9/2001 |
| JP | 2003-122394 | 4/2003 |
| JP | 2003 122394 | 4/2003 |
| JP | 2003-340764 | 12/2003 |
| JP | 2003 340764 | 12/2003 |
| JP | 2004 34274 | 2/2004 |
| JP | 2004-34274 | 2/2004 |
| JP | 2005 288573 | 10/2005 |

OTHER PUBLICATIONS

Japanese Office Action issued on Jun. 7, 2011 in corresponding Japanese Application No. 2008-515438 (with an English Translation).

Sato, K. et al., "Autonomous Guidance Robot System With Omnidirectional Image Sensor", The Transaction of the Institute of Electrical Engineers of Japan C, vol. 117-C, No. 10, pp. 1362 to 1369, (1997) (with partial English translation).

* cited by examiner

ROBOT

TECHNICAL FIELD

The present invention relates to a self-propelled robot.

BACKGROUND ART

Self-propelled robots capable of communicating various kinds of information (text or image information, audio information, or the like) with people have been known. For example, the robot mentioned in JP 2004-34274 includes: a body (cart) having two wheels; a chest mounted to the body; a head rotatably jointed to the chest; left and right arms rotatably jointed to the chest; or the like. On the head are two cameras serving as eyes. This robot recognizes with the cameras a person (user) who is a conversation partner, and controls the drive unit to move the body to the front of the user's body or face, which drive unit drives two wheels. Thus, the robot is capable of conducting a conversation (communicating) with the user by communicating information while looking at the user's eyes by directing the eyes (cameras) to the user. That is, in the eyes of the user, the robot conducts a conversation in front of the user, while looking at the user's eyes. Therefore, a friendly conversation is established.

DISCLOSURE OF THE INVENTION

Technical Problem

In some cases, depending on the purpose of use, a robot is required to communicate with a person while traveling, as is the case of a guide robot which conducts a conversation with a person to be guided (hereinafter, guide target) while traveling to guide the guide target to a predetermined position. In the robot of the above mentioned JP 2004-34274, however, the front surface of the body or the front surface of the chest faces the traveling direction while traveling on wheels. Thus, the robot is not capable of constantly directing the body, the chest, or the head to a person. Further, the robot is not able to make gestures with the arms provided to the body while directing the front surface of the body to a person, either. Accordingly, the robot of JP 2004-34274 is not able to communicate with a person while traveling.

The main object of the present invention is to provide a robot capable of traveling while constantly directing a predetermined part of a main body (body) toward a detection target such as a person.

Technical Solution and Effect

The first aspect of the present invention is a robot including: a main body; a traveling unit including a running wheel, which is jointed to the main body so that relative rotation is possible between the traveling unit and the main body; travel drive means for driving the running wheel; rotation drive means for rotating the main body relative to the traveling unit; control means for controlling the travel drive means and the rotation drive means, respectively; position detection means for detecting a position of a surrounding detection target, wherein the control means controls the rotation drive means based on a position of the detection target detected by the position detection means, so that a predetermined part of the main body constantly faces the detection target, while the traveling unit is traveling.

In the robot of the present invention, the main body is jointed to the traveling unit so that relative rotation is possible between the main body and the traveling unit. The control means controls the rotation drive means based on a position of a target detected by the position detection means, so that a predetermined part of the main body (e.g., front surface of the main body) constantly faces the detection target while the traveling unit is traveling. Hence, the robot is able to reliably communicate information with the detection target during traveling, for example, by constantly directing to the detection target a part necessary for information communication with the detection target (a part where a camera, a microphone, a display, a speaker, or the like are provided). Alternatively, the robot is capable of directing a front surface of the main body to the detection target, and presenting motions with the head, arm, or the like (gesture) to the detection target during traveling.

Note that position information of the detection target to be obtained by the position detection means may be information on a position itself of the detection target (information on both distance from the robot, and direction). Meanwhile, if the robot at least recognizes the direction in which the detection target is present, the robot is capable of directing a predetermined part of the main body to the direction. Thus, the position information of the detection target to be detected by the position detection means may only be on the direction in which the detection target is present.

The second aspect of the present invention is the robot of the first invention, which further includes information obtaining means for obtaining information from the detection target, wherein at least a part of the information obtaining means is provided to the predetermined part of the main body. According to the structure, the information obtaining means obtains information from the detection target (e.g., visual information such as a body type, posture, body language, or the like of a person who is a detection target, and audio information such as voice output by the person). At least a part of such information obtaining means constantly faces a direction of the detection target during traveling. Thus, the information obtaining means is able to reliably obtain information from the detection target.

The third aspect of the present invention is the robot of the first or second aspect, which further includes information transmit means for transmitting information to the detection target, wherein at least a part of the information transmit means is provided to the predetermined part of the main body. According to the structure, at least a part of the information transmit means constantly faces a direction of the detection target. Thus, the information transmit means is able to reliably transmit various kinds of information such as image information, audio information, or the like to a detection target.

The fourth aspect of the present invention is the robot of any one of the first to third aspects, wherein the control means controls the travel drive means based on a position of the detection target detected by the position detection means, so that the traveling unit travels while maintaining a distance to the detection target within a predetermined range. According to the structure, the robot is apart from the detection target by a distance within a certain range, so that the robot is not too close to or not too far from the detection target. This enables the robot to stably communicate information with the detection target even during traveling.

The fifth aspect of the present invention is the robot of any one of the first to fourth aspects wherein the main body includes: a body jointed to the traveling unit so that relative rotation is possible between the body and the traveling unit; a head rotatably provided to an upper end of the body; and two arms provided in a swingable manner to both sides of the body, respectively. According to the structure, a front surface of the body constantly faces the detection target during traveling. This enables the detection target to easily recognize motions of both of the left and right arms or the head (gesture).

REFERENCE NUMERALS

1 GUIDE ROBOT
10 MAIN BODY
11 TRAVELING UNIT
20 DISPLAY
21 POSITION DETECTION SENSOR
22 CCD CAMERA
23 MICROPHONE
24 SPEAKER

BEST MODE FOR CARRYING OUT THE INVENTION

An embodiment of the present invention is described below. The present embodiment deals with an example where the present invention is applied to a self-propelled guide robot which guides a guide target to a target position.

Figure 1:
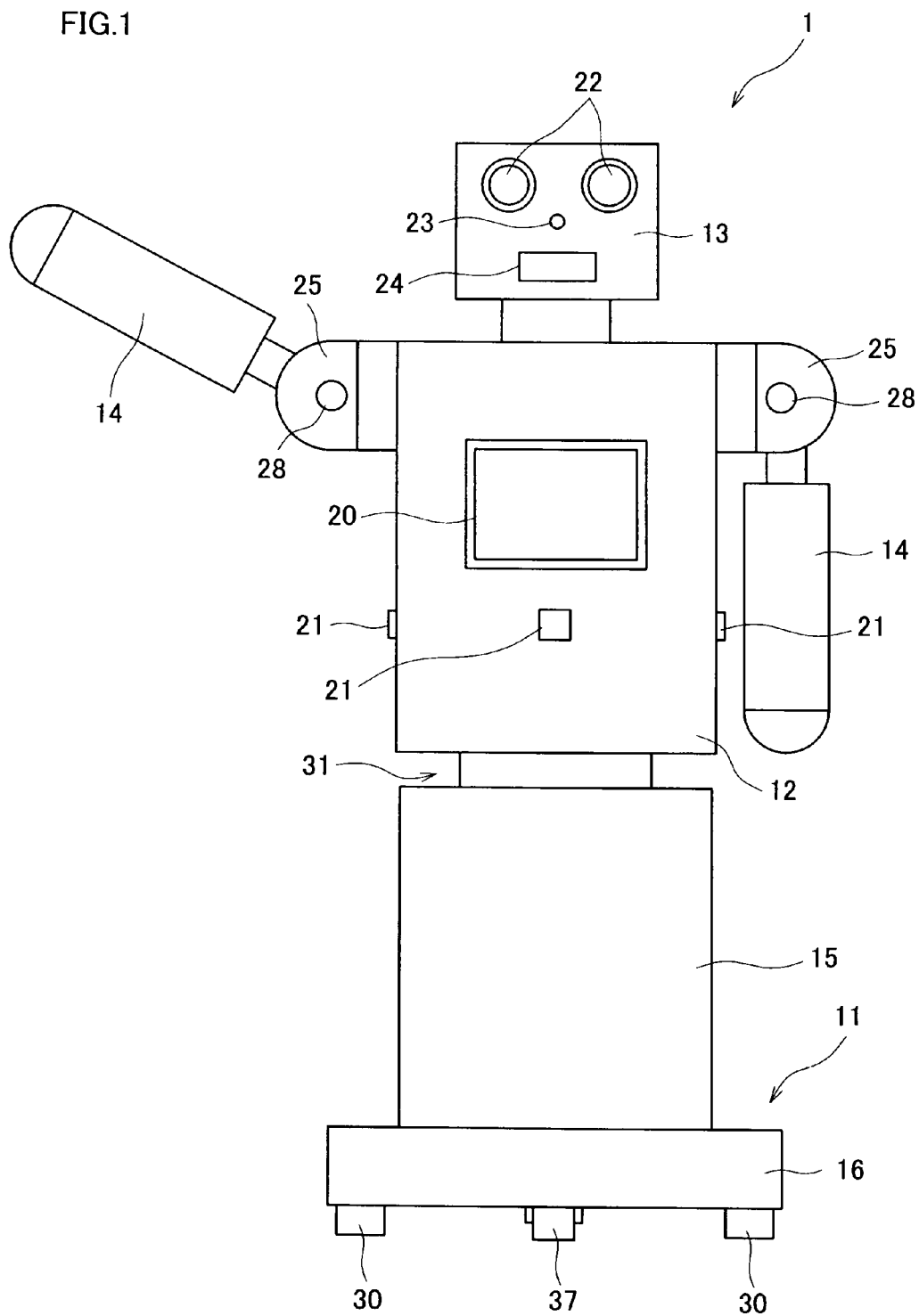
FIG. 1 is a front view of a guide robot of an embodiment, according to the present invention.
Figure 2:
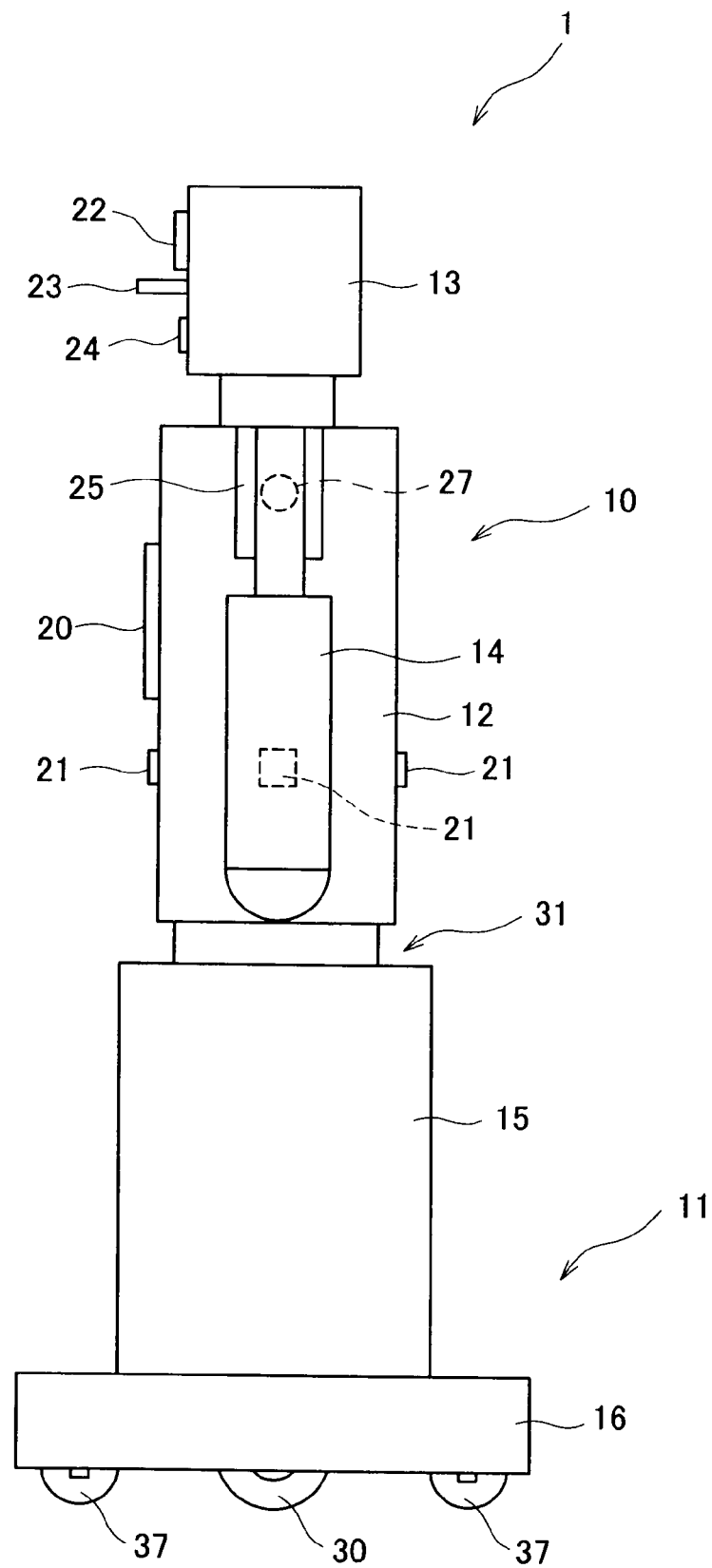
FIG. 2 is a side view of the guide robot.

As illustrated in FIG. 1 and FIG. 2, a guide robot 1 is provided with: a main body 10 including a body 12, a head 13, and arms 14; a traveling unit 11 jointed to the main body 10 so that relative rotation is possible between the traveling unit 11 and the main body 10; a control device 17 (control means: see FIG. 4) which controls an operation of each part of the guide robot 1.

On a front surface of the body 12 (the surface on the side of FIG. 1 facing the viewer) is a display 20 which displays text information or image information provided to a guide target. On a surface of the display 20 is a touch panel serving as an input device. Further, on a side surface of the body 12 are a plurality of (e.g., four) position detection sensors 21 (position detection means). Each of the position detection sensors 21 is capable of detecting positions of various objects 50 (detection targets), including a guide target, around the guide robot 1. An ultrasonic sensor or a laser sensor can be adopted as a position detection sensor 21.

Figure 6:
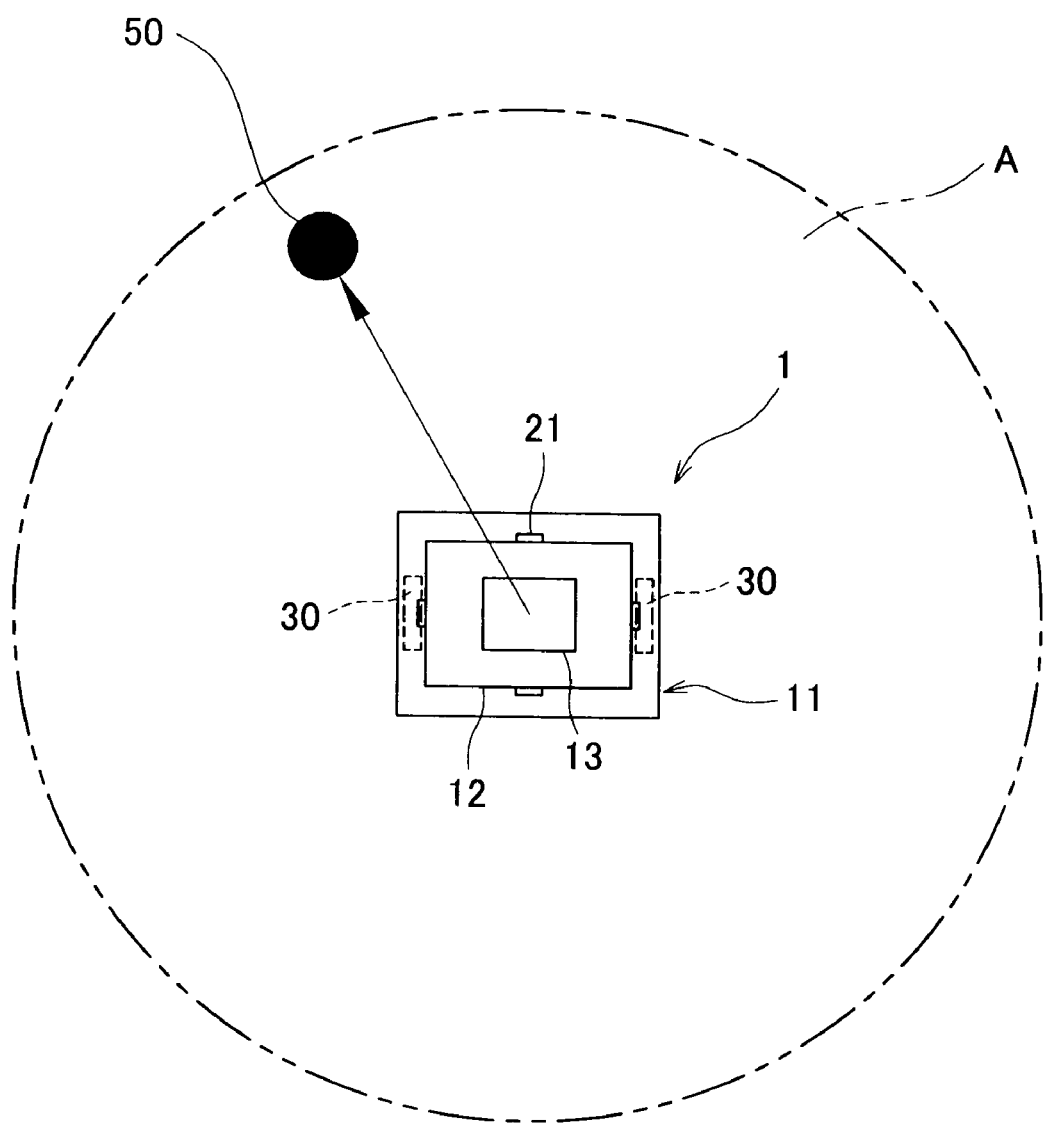
FIG. 6 illustrates a state when a detection target is present in a detectable area of a position detection sensor.
Figure 7:
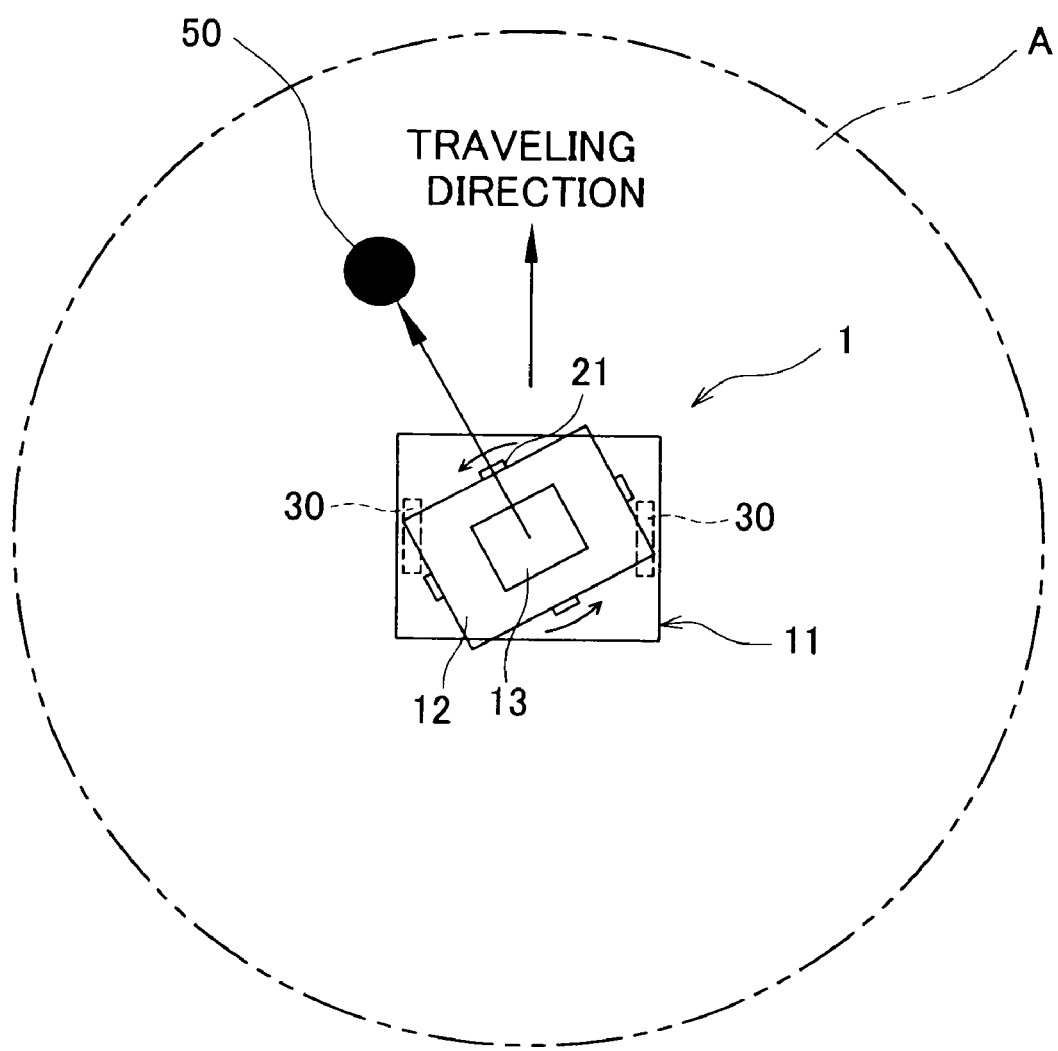
FIG. 7 illustrates a guide robot traveling while directing a front surface of a body and a head to a detection target.

Thus, as illustrated in FIG. 6 and FIG. 7, the guide robot 1 is capable of detecting, with the position detection sensors 21, in which direction the guide target is present, and how far apart the guide target is from the robot, within a circular detectable area A around the body 12.

On the upper end of the body 12 is a head 13 jointed rotatably around the vertical axis (illustration omitted). The head 13 is driven by a head driving motor 46 (see FIG. 4). On a front surface of the head 13 (the surface on the side of FIG. 1 facing the viewer) are a CCD camera 22, a microphone 23, and a speaker 24. The CCD camera 22 obtains visual information on a detection target such as a guide target around the guide robot 1 (e.g., a body type, posture, body language or the like of the guide target). The microphone 23 obtains audio information output from surrounding detection target or the like. The speaker 24 outputs audio information to the surroundings.

Note that the CCD camera 22 and the microphone 23 provided on the front surface of the head 13 serve as the information obtaining means of the present invention, which obtains information from a detection target. Further, the display 20 provided on the front surface of the body 12, and the speaker 24 provided on the front surface of the head 13 serve as the information transmit means of the present invention, which transmits information to the detection target.

On the left and right sides of the upper body 12, two shoulders 25 are provided, respectively. Each shoulder 25 is rotatably jointed via a shaft 27 extended in the left/right directions. The two shoulders 25 are respectively provided with two arms 14. Each arm 14 is rotatably jointed via a shaft 28 extended in the front/back directions (in a direction orthogonal to the surface of FIG. 1) The two shoulders 25 are driven to rotate around the shaft 27 by shoulder drive motors 42 and 43, respectively (see FIG. 4). The two arms 14 are driven to rotate around the shaft 28 by arm drive motors 44 and 45, respectively (see FIG. 4). Thus, each of the arms 14 is capable of swinging in front, back, right, and left directions about the shoulder 25.

The traveling unit 11 includes a pedestal 15, a frame member 16, and two running wheels 30. The frame member 16 is fixed to a lower end of the pedestal 15. The two running wheels 30 are rotatably provided to left and right ends of the frame member 16, respectively.

Figure 3:
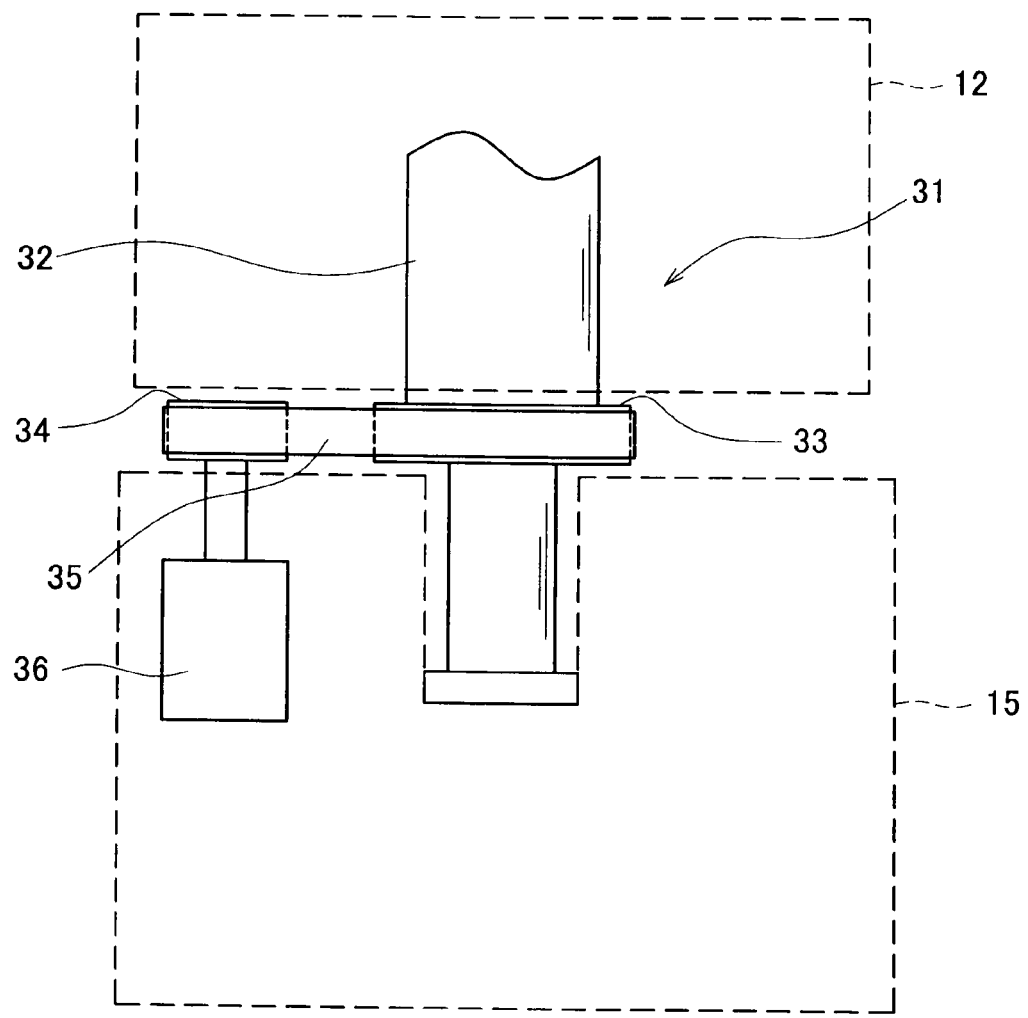
FIG. 3 is a magnified view of a joint jointing a body and a pedestal.

The pedestal 15 is jointed to the body 12 via the joint unit 31 so that relative rotation is possible between the pedestal 15 and the body 12. As illustrated in FIG. 3, the joint unit 31 includes a joint shaft 32, two pulleys 33 and 34, a belt 35 looped around the two pulleys 33 and 34, and a body drive motor 36 (rotation drive means) which rotates the pulley 34.

The upper end of the joint shaft 32 is fixed to the center of the lower end of the body 12. The lower end of the joint shaft 32 is rotatably supported by the pedestal 15. The joint shaft 32 is a hollow shaft having a hole inside. Inside the joint shaft 32 are a power supply cable for motors or the like, a control cable, or the like.

Of the two pulleys 33 and 34, the pulley 33 is fixed to a non-edge part of the joint shaft 32 in the longitudinal direction. The pulley 34 is coaxially provided to an output shaft of the body drive motor 36. Thus, when the body drive motor 36 rotates the pulley 34, the rotation transfers to the joint shaft 32 via the belt 35 and the pulley 33, causing the body 12 and the joint shaft 32 to integrally rotate relative to the traveling unit 11.

The two running wheels 30 are connected to two wheel drive motors 40 and 41 (see FIG. 4: travel drive means), respectively. Further, to the leading and trailing ends of the frame member 16, two auxiliary wheels (casters) 37 are rotatably provided, respectively. The traveling unit 11 is able to travel on a smooth surface by rotating the two running wheels 30 with the two wheel drive motors 40 and 41 and rotating the two auxiliary wheels 37 by the rotation of the running wheels. Further, the two running wheels 30 on the left and right can be driven to rotate by the two wheel drive motors 40 and 41 at different rotation speeds, respectively. Doing so will create a difference in the movement of the two running wheels 30, thus enabling the traveling unit 11 to turn to any given direction (traveling direction).

As described above, the main body 10 (body 12) is rotatable relative to the traveling unit 11 (pedestal 15). Thus, while the traveling unit 11 is traveling in a predetermined direction, the front surface of the body 12 can face a different direction from a traveling direction of the traveling unit 11. Thus, the guide robot 1 is capable of traveling while constantly directing, to the guide target, the front surface of the body 12 where the display 20, the CCD camera 22, or the like are provided. This structure is detailed later.

Figure 4:
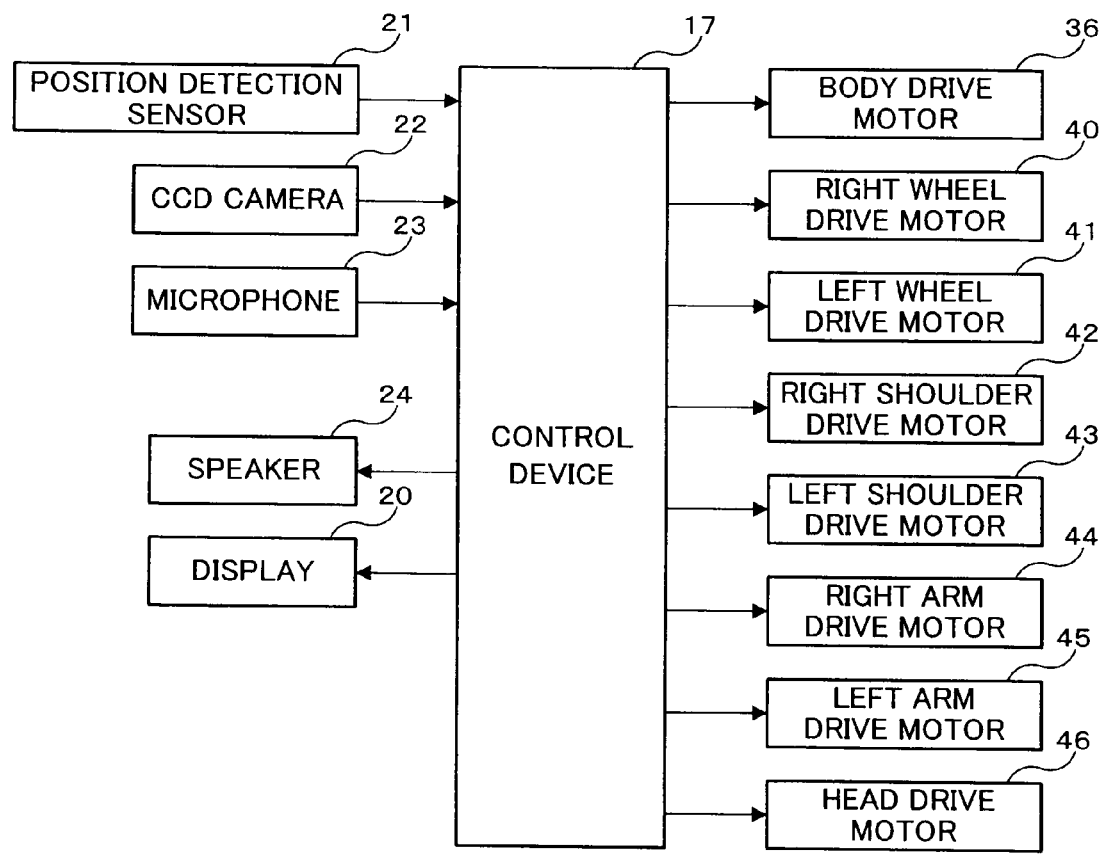
FIG. 4 is a block diagram illustrating an electric structure of the guide robot, centering on a control device.

Next, the following describes an electric structure of the guide robot 1, centering on the control device 17, with reference to the block diagram of FIG. 4. The control device 17 includes a CPU (Central Processing Unit); a ROM (Read Only Memory) storing a program, data, or the like for controlling each part of the guide robot 1; a RAM (Random Access Memory) which temporarily stores data to be processed in the CPU; or the like.

The control device 17 receives information on the detection target (e.g., position information, visual information, audio information, or the like) obtained with the plurality of position detection sensors 21, the CCD camera 22, and the microphone 23. Further, the control device 17 outputs information to be transmitted to the guide target (e.g., text information, audio message, or the like) to the display 20 and the speaker 24. Further, based on the information on the detection target obtained with the position detection sensors 21, the CCD camera 22 or the like, the control device 17 controls each of the motors 36, 40, 41, 42, 43, 44, 45, and 46 to drive each part of the guide robot 1 (the body 12, head 13, shoulder 25, arm 14, and running wheels 30), and thus performs a predetermined guiding operation set by a program stored in the ROM.

Figure 5:
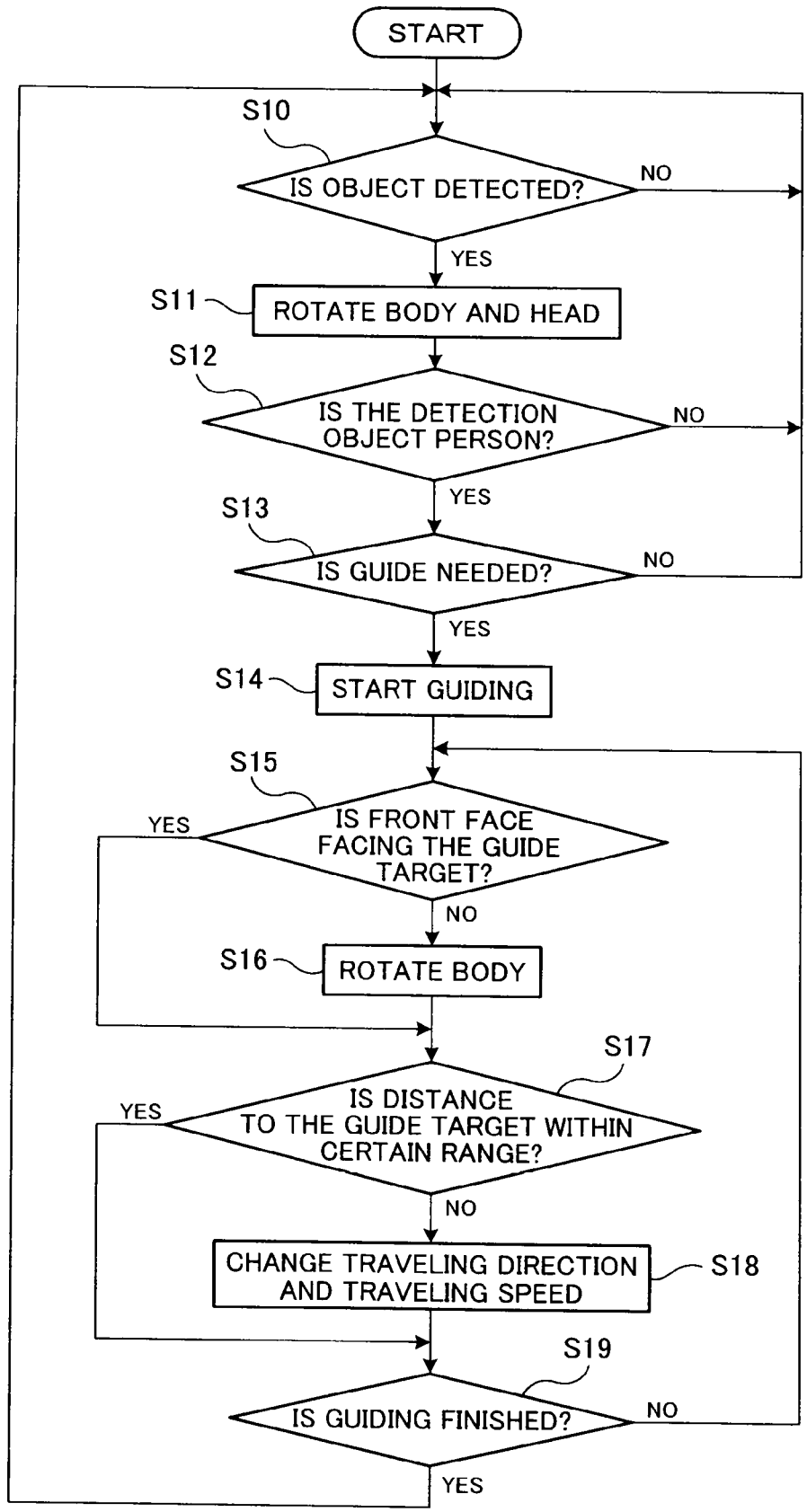
FIG. 5 is a flow chart illustrating a guiding operation of the guide robot.

The following more specifically describes a series of guiding operation control operations of the guide robot 1 performed by the control device 17, with reference to the flow chart of FIG. 5, and FIG. 6 and FIG. 7. Note that illustrations of the arms 14 of the guide robot 1 are omitted in FIG. 6 and FIG. 7.

First, when the guide robot 1 approaches an object, or an object approaches the guide robot 1, and when an object 50 is detected in the detectable area A by any one of the position detection sensors 21 provided to the body 12 (step S10: YES), the body drive motor 36 and the head drive motor 46 rotates the body 12 and the head 13, respectively, causing the body 12 and the head 13 to face the object 50 (detection target) (step S11). Then, the CCD camera 22 provided on the front surface of the head 13 images the detection target 50 to obtain image data of an outline of the detection target 50.

Next, based on the image data obtained by the CCD camera 22, the control device 17 determines whether or not the detection target 50 is a person (step S12). For example, the control device 17 analyzes the image data of the detection target 50 obtained by the CCD camera 22. Based on whether or not the control device 17 confirms a human face from the image data, the control device 17 determines whether the detection target 50 is a person. Here, the image data analysis for facial recognition is performed only when a detection target 50 is detected with a position detection sensor 21. This considerably reduces a load put on the control device 17. Further, according to the position information of the detection target 50 obtained by the position detection sensor 21, the control device 17 is capable of inferring which part of the image data obtained with the CCD camera 22 contains facial data. Thus, with the control device 17, analysis of the entire image data obtained is not necessary, and the presence/absence of a face is determined by analyzing only a part inferred as a face. This further reduces a load necessary for facial recognition on the control device 17.

When the detection target 50 is confirmed as a person (step S12: YES), the wheel drive motors 40 and 41 rotate the two running wheels 30, causing the traveling unit 11 to approach the person 50, and the guide robot 1 confirms thereafter whether the person 50 needs a guide by the guide robot 1 (step S13). For instance, the guide robot 1 may confirm whether or not a guide is needed, by outputting an audio message to the person 50 from the speaker 24, and obtaining a response from the person 50 through the microphone 23 thereafter. Alternatively, the guide robot 1 may confirm whether or not a guide is needed by displaying a message on the display 20, and then receiving a response from the person 50 to the message, in the form of input through the touch panel provided to the display 20.

When confirmation is made that the person 50 detected needs a guide (step S13: YES), the guide robot 1 starts a guiding operation (step S14). In other words, the guide robot 1 displays on the display 20 predetermined text information or image information, and communicates audio information with the guide target 50 (conversation) through the speaker 24 and the microphone 23. Further, the guide robot 1 causes the traveling unit 11 to lead the guide target 50 to a target position while making various gestures. The gestures include: raising the shoulder 25 to point at a target position with the arm 14; making body motions such as swinging the arms 14 up and down, or to the left and right; rotating the head 13; or the like.

Here, the guiding robot 1 constantly keeps track of a position of the guide target 50 with the position detection sensors 21 during the guiding operation. Then, when the front surface of the main body 10 (the body 12 and the body 13) is not facing the guide target 50 (step S15: NO), the control device 17 controls the drive motor 36 based on the position information of the guide target 50, to rotate the body 12 relative to the traveling unit 11, causing the front faces of the body 12 and the head 13 provided to the body 12 to face the guide target 50 (step S16). Note that when the front surface of the body 12 faces a different direction from that of the head 13, the control device 17 controls the head drive motor 46 to rotate the head 13 so that the head 13 faces the same direction as the body 12.

In other words, the display 20 provided on the front surface of the body 12, the CCD camera 22, the microphone 23, and the speaker 24 provided on the front surface of the head 13 constantly face the guide target 50, even during traveling. Hence, the following information on the guide target 50 is reliably obtained by the CCD camera 22 and the microphone 23: visual information such as a body type or a posture of the guide target 50, or body language; and audio information output by the guide target 50. Further, the display 20 or the speaker 24 outputs text information, image information, or audio information to the guide target 50 while facing the guide target 50. This enables the guide target 50 to reliably obtain the information. Accordingly, the guide robot 1 is able to travel while carrying on a conversation with the guide target. Further, the front surface of the body 12 faces the guide target 50. The guide target 50 therefore is able to (i) observe, from the front of the guide robot 1, a gesture made with the left and right arms 14 or the head 13 provided to the body 12, and (ii) easily understand the gesture. This improves a guiding quality.

Further, if the distance, detected by the position detecting sensor 21, between the guide robot 1 and the guide target 50 is out of a predetermined range which enables mutual transmission of information (i.e., communication) (step S17: No), the control device 17 controls the wheel drive motors 40 and 41 based on the position information of the guide target 50, to change the traveling direction or the traveling speed so that the distance between the guide robot 1 and the guide target 50 is within a predetermined range (step S18). That is, the traveling unit 11 travels so as to maintain the distance between the guide robot 1 and the guide target 50 within a predetermined range. Thus, the guide robot 1 is not too close or not too far from the guide target 50. This ensures continuous communications between the guide robot 1 and the guide target 50 during traveling.

The guide robot 1 executes a predetermined guiding operation by repeating steps S15 to S18. When the guide robot 1 finishes guiding the guide target 50 to the target position (step S19: YES), the guide robot 1 returns to step S10 to guide another guide target.

With the guide robot 1 of the above embodiment, the body 12 of the main body 10 is jointed to the traveling unit 11 so that relative rotation is possible between the body 12 and the traveling unit 11 is possible. The control device 17 controls the body drive motor 36 based on a position of a guide target detected by the position detection sensors 21 to rotate the main body 10 relative to the traveling unit 11, so as to cause the front surface of the main body 10 (the body 12 and the head 13) to constantly face the guide target. Thus, the front surface of the main body 10 constantly faces the guide target even while the guide robot 1 travels, which surface has the CCD camera 22, the microphone 23, the speaker 24, the display 20, or the like. Thus, the robot 1 is able to reliably communicate information with the guide target. Further, the guide robot 1 is able to direct the body 10 to the guide target while traveling parallel to a walking guide target. This enables the guide target to easily recognize a gesture made with the arms 14 or the head 13, thus improving a guiding quality.

Next, the following describes an alternative form which is the above embodiment with various changes added thereto. However, the members that have the similar structure as those of the above embodiment are given the same numbers (symbols), and the descriptions of those members are omitted.

1. In order to direct the front surface of the main body 10 to the detection target while the traveling unit 11 is traveling, the position detection sensors 21 need to detect only a direction in which the detection subject is present. Thus, the position detection sensors 21 do not necessarily have to be capable of detecting a distance between the guide robot 1 and the detection object. For example, the microphone 23 may be adopted as a position detection sensor 21 instead of the above-described ultrasonic sensor or laser sensor, and the microphone 23 may detect a direction of the detection target which is a sound source.

2. Positions of the CCD camera 22, microphone 23, speaker 24 and display 20 may be changed if necessary. First, all of the CCD camera 22, microphone 23, speaker 24 and display 20 do not necessarily have to be provided on the front surface of the main body 10. For example, when a nondirectional (omnidirectional) microphone is adopted, audio information can be obtained from any direction. In this case, a microphone does not necessarily have to be provided on the front surface of the main body 10. Further, at least one of the CCD camera 22, the microphone 23, the speaker 24, and the display 20 may be provided to a part of the main body 10 other than the front surface (e.g., side surface), and this part may face a detection target during traveling.

Further, at least one of the CCD camera 22, the microphone 23, and the speaker 24 may be provided to the body 12. Alternatively, the display 20 may be provided to the head 13.

3. The embodiment described hereinabove is an exemplary application of the present invention to a guide robot which guides a guide target to a target position. However, the application of the present invention to a robot is not limited to a guide robot. For example, the present invention may be applied to various robots required to communicate with a person, such as a meal-serving robot which carries a meal to a person, or an education robot which tutors a person.

The invention claimed is:

1. A robot for guiding a person to a destination comprising:
a main body;
a traveling unit including a pedestal and a running wheel at a lower portion of the traveling unit, the traveling unit jointed to the main body by a joint shaft so that the pedestal of the traveling unit and the main body are rotatable relative to each other;
travel drive means for driving the running wheel;
rotation drive means for performing relative rotation of the main body relative to the traveling unit;
control means for controlling the travel drive means and the rotation drive means, respectively; and
position detection means for detecting a position of the person in the surrounding area, wherein
the control means controls the rotation drive means based on a position of the person detected by the position detection means so that a predetermined part of the main body constantly faces the person while the traveling unit is traveling to guide the person to the destination, for all directions of travel of the traveling unit when guiding the person to the destination, so as to be able to guide the person to the destination while carrying on a conversation with the person.

2. The robot according to claim 1, further comprising:
information obtaining means for obtaining information from the person,
wherein at least a part of the information obtaining means is provided to the predetermined part of the main body.

3. The robot according to claim 2, further comprising:
information transmit means for transmitting information to the person,
wherein at least a part of the information transmit means is provided to the predetermined part of the main body.

4. The robot according to claim 3, wherein the control means controls the travel drive means based on a position of the person detected by the position detection means, so that the traveling unit travels while maintaining a distance to the person within a predetermined range.

5. The robot according to claim 3, wherein the main body includes:
a body jointed to the traveling unit so that relative rotation is possible between the body and the traveling unit;
a head rotatably provided to an upper end part of the body; and
two arms which are provided in a swingable manner to both sides of the body, respectively.

6. The robot according to claim 4, wherein the main body includes:
a body jointed to the traveling unit so that relative rotation is possible between the body and the traveling unit;
a head rotatably provided to an upper end part of the body; and
two arms which are provided in a swingable manner to both sides of the body, respectively.

7. The robot according to claim 2, wherein the control means controls the travel drive means based on a position of the person detected by the position detection means, so that the traveling unit travels while maintaining a distance to the person within a predetermined range.

8. The robot according to claim 7, wherein the main body includes:
a body jointed to the traveling unit so that relative rotation is possible between the body and the traveling unit;
a head rotatably provided to an upper end part of the body; and
two arms which are provided in a swingable manner to both sides of the body, respectively.

9. The robot according to claim 2, wherein the main body includes:
a body jointed to the traveling unit so that relative rotation is possible between the body and the traveling unit;
a head rotatably provided to an upper end part of the body; and
two arms which are provided in a swingable manner to both sides of the body, respectively.

10. The robot according to claim 1, further comprising:
information transmit means for transmitting information to the person,
wherein at least a part of the information transmit means is provided to the predetermined part of the main body.

11. The robot according to claim 10, wherein the control means controls the travel drive means based on a position of the person detected by the position detection means, so that the traveling unit travels while maintaining a distance to the person within a predetermined range.

12. The robot according to claim 11, wherein the main body includes:
a body jointed to the traveling unit so that relative rotation is possible between the body and the traveling unit;
a head rotatably provided to an upper end part of the body; and
two arms which are provided in a swingable manner to both sides of the body, respectively.

13. The robot according to claim 10, wherein the main body includes:
a body jointed to the traveling unit so that relative rotation is possible between the body and the traveling unit;
a head rotatably provided to an upper end part of the body; and
two arms which are provided in a swingable manner to both sides of the body, respectively.

14. The robot according to claim 1, wherein the control means controls the travel drive means based on a position of the person detected by the position detection means, so that the traveling unit travels while maintaining a distance to the person within a predetermined range.

15. The robot according to claim 14, wherein the main body includes:
a body jointed to the traveling unit so that relative rotation is possible between the body and the traveling unit;
a head rotatably provided to an upper end part of the body; and
two arms which are provided in a swingable manner to both sides of the body, respectively.

16. The robot according to claim 1, wherein the main body includes:
a body jointed to the traveling unit so that relative rotation is possible between the body and the traveling unit;
a head rotatably provided to an upper end part of the body; and
two arms which are provided in a swingable manner to both sides of the body, respectively.

17. The robot according to claim 1, wherein the pedestal is fixed to a frame member at a lower end of the pedestal, the frame member being connected to the running wheel.

18. The robot according to claim 1, wherein an upper end of the joint shaft is fixed to the body and a lower end of the joint shaft is rotatably supported by the pedestal.

* * * * *